United States Patent Office 3,450,170
Patented June 17, 1969

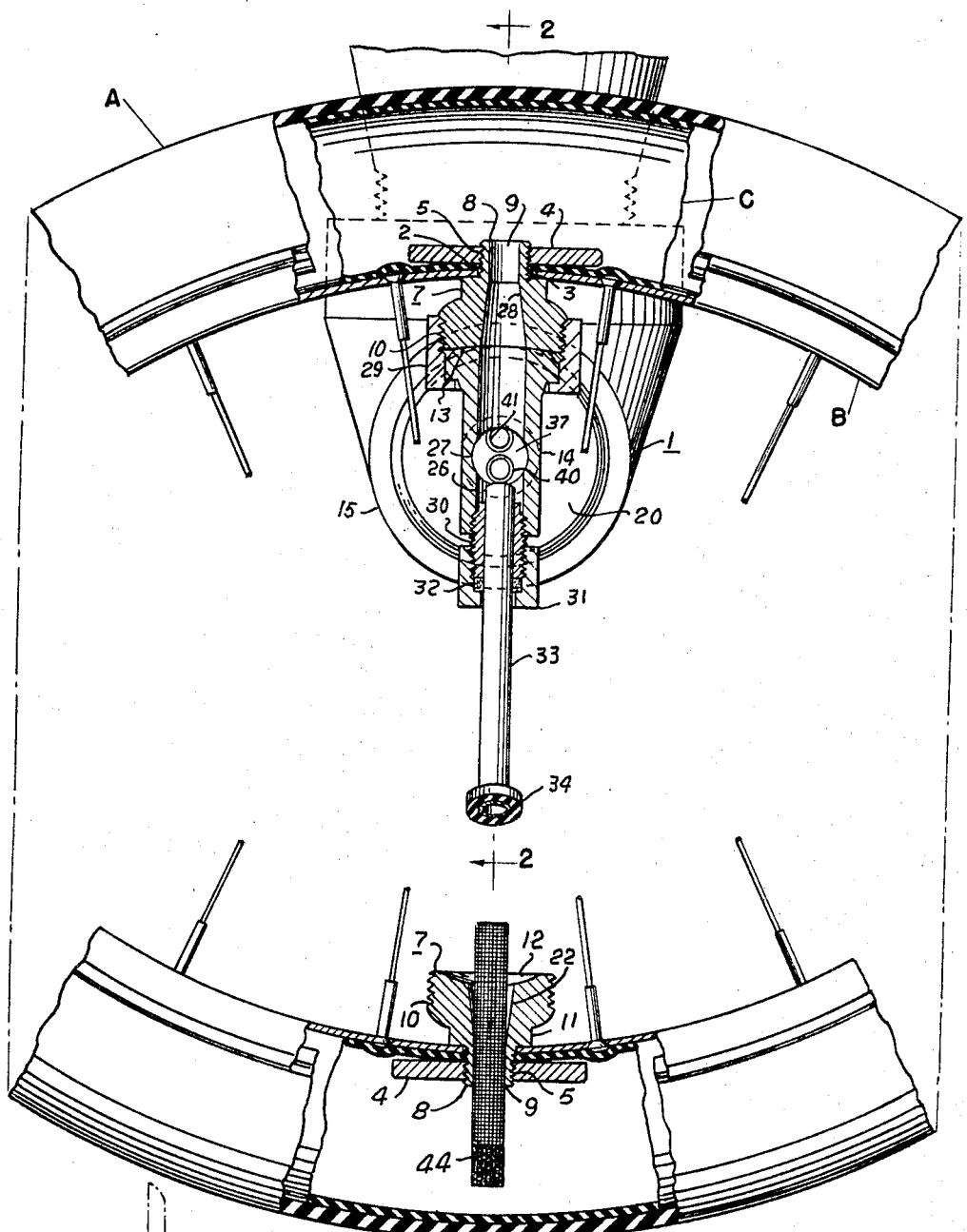
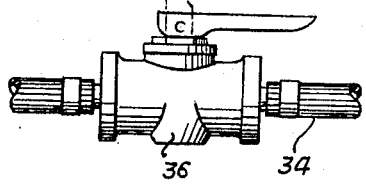
FIG. 1
FIG. 9
INVENTOR
Keith M. Andersen

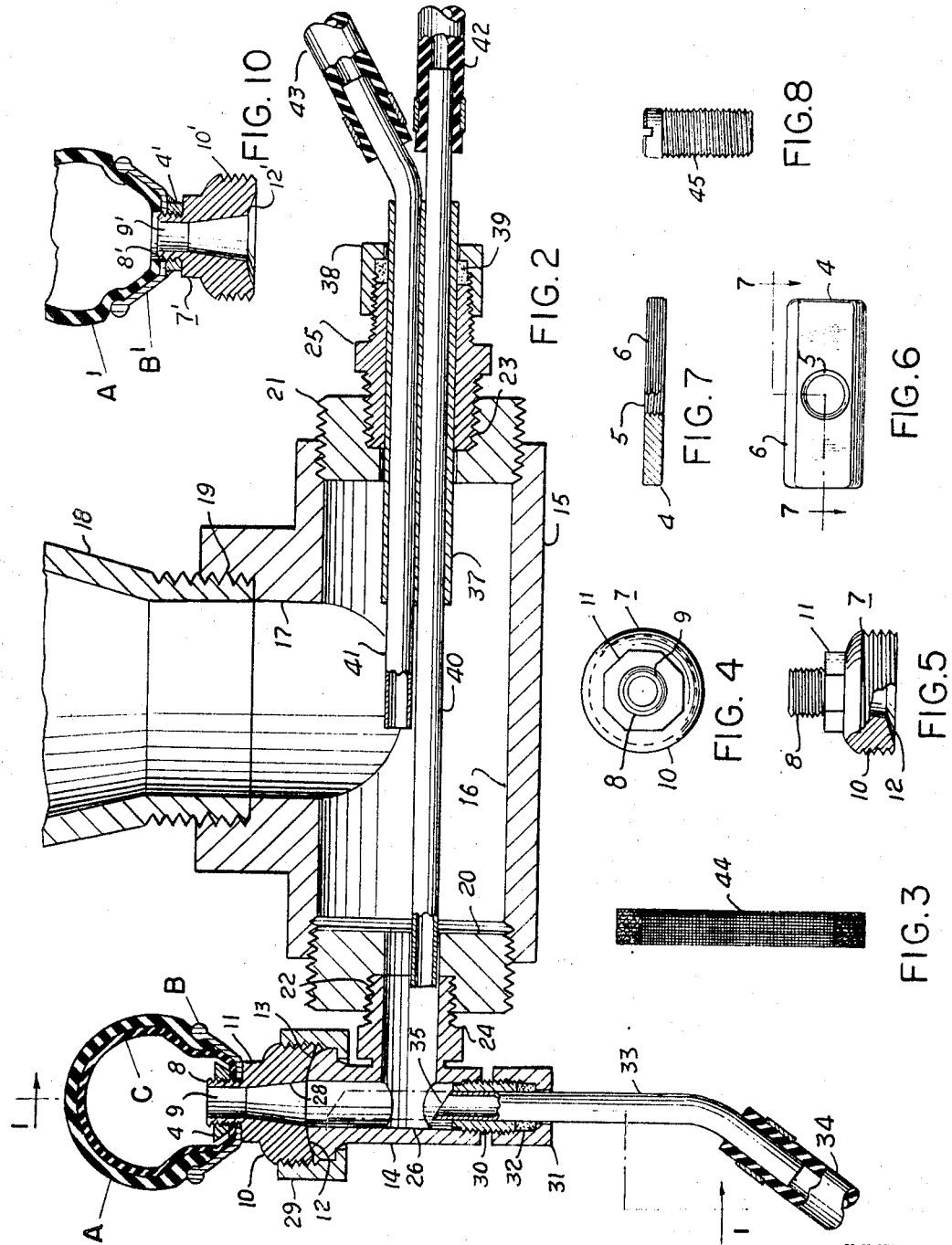

3,450,170
METHOD OF AND MEANS FOR FILLING PNEUMATIC TIRES WITH COMMINUTED ELASTIC MATERIAL
Keith M. Andersen, 1629 Glen Valley, Irving, Tex. 75060
Filed June 21, 1967, Ser. No. 647,797
Int. Cl. B29h *13/00;* B65b *31/00*
U.S. Cl. 141—5
13 Claims

ABSTRACT OF THE DISCLOSURE

A method of and apparatus for filling with rubber dust a pneumatic tire mounted on a rim and having an inner tube or being tubeless wherein a pair of substantially diametrically opposed openings are formed in the rim for communicating with the interior of the tire. Rubber dust under air pressure is injected through one of the rim openings at a time while screening the other opening to permit air exhaustion without escape of the dust, the injection including the supply of rubber dust to a passage for conducting said dust to one of said openings. The air being jetted at spaced points into the passage to force the rubber dust into the tire interior and prevent bridging of said dust resulting from back pressure.

BACKGROUND OF THE INVENTION

Field of the invention

Methods of and means for filling a pneumatic tire with comminuted elastic material.

Description of the prior art

Although pneumatic tires are highly desirable due to their cushion and heat dissipation characteristics, such qualities are not essential when the vehicles upon the wheels of which the tires are mounted are relatively slow moving and are used on rough or unpaved surfaces or at remote locales whereby nondeflatable or semisolid tires are more serviceable and preferable. Typical examples of these types of vehicles are bicycles, motorcycles, golf carts, tractors and wheel barrows, the tires of which are subject to frequent abuse and consequent puncture and deflation without a spare tire or means for changing and/or repairing the deflated tire being readily available. Since the majority of tires are of the pneuematic type, various attempts have been made to convert such tires to the nondeflatable type for specialized uses while retaining sufficient resiliency to provide a measure of shock absorption and prevent undue damaging of the relatively thin walls of conventional pneumatic tires. Foam rubber, polyurethane, polyethylene and similar elastic palstics have been suggested as substitute fillers for pneumatic tires or the inner tubes thereof but are not economically feasible due to the cost thereof or the cost of installation as well as being of limited durability. Even though an elastic substitute filler for pneumatic tires is most desirable for the aforesaid specialized uses, it is essential that the filler material be relatively inexpensive and capable of economical insertion at relatively remote locations, such as service stations, garages, bicycle shops and similar suburban and small town stores. Also, the elastic filler material must be comminuted or pulverized to permit flow thereof through relatively small or restricted passages. Insofar as known, no one heretofore has discovered a satisfactory method of or means for injecting dry comminuted filler material into the interior of a tire or other article of relatively small transverse area through such restricted passages.

Examples of the prior art are:

840,469, January 1907, Berry
2,349,594, May 1944, McMahan
2,415,019, January 1947, McMahan
2,525,256, October 1950, Byrom
3,022,810, February 1962, Lambe
3,200,858, August 1965, Kampert

SUMMARY OF THE INVENTION

This invention relates to a method of filling with rubber dust or other comminuted elastic materials a pneumatic tire mounted on a rim and having an inner tube or being tubeless wherein a pair of openings are formed in the rim in generally opposed relationship for communicating with the interior of the tire or its tube, said tube having the openings extending through its inner peripheral portion. Rubber dust under pressure is injected into the interior of the tire or tube through one of the openings of the rim at a time, while the other opening is obstructed sufficiently to prevent the escape of the dust and permit the exhaust of the pressure fluid from said tire interior, the injection of said rubber dust including the supplying thereof to a passage for conducting said dust to one of said openings. Streams of air or other dry gaseous fluid under pressure are jetted intermittently into the passage at spaced points to force the rubber dust into the tire interior and prevent bridging of said dust, the air streams entering said passage adjacent the rim opening and between such entry point and the dust supply point of said passage. Preferably, the entry of the air stream adjacent the rim opening is substantially alined therewith and movable axially thereof to facilitate the flushing of rubber dust therefrom and thereby prevent clogging of said opening.

Even though the aforesaid air streams are capable of feeding rubber dust from the passage through the rim opening into the tire interior, this feeding is relatively slow due to the remoteness of the points of entry of said streams relative to the supply point of said dust. In order to accelerate the filling of the tire interior, a third stream of air is jetted intermittently into the passage adjacent, preferably contiguous, the rubber dust supply point for blowing the dust toward the rim opening. In fact, the third air stream is adapted to be utilized as the primary rubber dust feeder with the second air stream assisting this feeding as well as the prevention of bridging in coaction with the first air stream. Due to its proximity to the rim openings, the third air stream is employed to finish the filling operation as well as initiate the same. Since the rim opening necessarily must be of relatively small area and the rubber dust has a tendency to bridge across and clog said opening, the air streams must be actuated intermittently in sequence from the first to the third stream and from said third to the second and/or first streams.

Although rubber dust is an ideal substitute filler for pneumatic tires due to its elasticity, ready availability and inexpensiveness, this elasticity accentuates the packing characteristics of comminuted, finely divided or pulverized material and increases the difficulty of injecting such material; this is particularly so when the tires, such as bicycle tires, are of small radial or transverse area. Due to this factor as well as the annular contour of tires, it is impossible to completely fill the interior of a tire with rubber dust through a single opening whereby it is necessary to provide a pair of substantially diametrically opposed insertion openings. Also, it is essential that the entry of one of the air streams be in close proximity to the insertion opening, the substantial alinement of said entry with said opening and its axial movability enhancing the effectiveness of said air stream.

A construction designed to carry out the invention will be hereinafter described, together with other features of the invention.

BRIEF DESCRIPTION OF THE DRAWINGS

FIG. 1 is a side elevational view, partially in section and taken on line 1—1 of FIG. 2 in part, of opposed portions of a bicycle tire connected to a filling apparatus constructed in accordance with the invention, FIG. 2 is a transverse, vertical, sectional view, taken on the line 2—2 of FIG. 1, showing a portion of the tire, FIG. 3, is a side elevational view, partly in section, of the filter screen for insertion in one of the openings of the tire rim during filling of the tire through the other rim opening, FIG. 4 is a plan view of one of the filler nipples, FIG. 5 is a side elevational view of the filler nipple, FIG. 6 is a plan view of one of the fasteners for securing the nipples in the rim openings, FIG. 7 is a transverse, vertical, sectional view taken on the line 7—7 of FIG. 6, FIG. 8 is a side elevational view of one of the plugs for coacting with the fasteners to close the rim openings, FIG. 9 is a reduced, side elevational view showing a typical valve mounted in one of the pressure fluid supply lines, and FIG. 10 is a transverse sectional view showing one of the filler nipples mounted in a modified manner.

DESCRIPTION OF THE PREFERRED EMBODIMENTS

In the drawings, the numeral 1 designates an apparatus for filling a pneumatic tire A with a comminuted elastic material in accordance with the method of this invention. The tire A, which is shown as being of the bicycle type, is mounted on the annular rim B of a wheel and may have an inner tube C; however, it is noted that said tire may be tubeless and that the invention is not limited to use with a tube-type tire. It has been found that rubber dust is an ideal filler due to its inexpensiveness, durability and ready availability as well as its shock absorption quality which is inherent from its elasticity. At the present time, there is little, if any use for rubber dust which is a waste product of tire recapping and similar finishing operations involving the buffing of tires and other rubber products. Since rubber dust is a dry as well as an elastic material, the particles thereof tend to cling to one another so as to bridge across and clog passages and other openings of relatively small width or transverse area. Accordingly, it is extremely difficult to fill the interior of a tire to a density sufficient to adequately support the relatively thin wall of the tire and the problem is accentuated when the radial or transverse area of said tire interior is restricted or relatively small. Of course, large particles increase the bridging tendency and it is beneficial to size the rubber dust as uniformly as economically practical; this sizing may be conveniently accomplished by passing said dust through a screen or other foraminous material having a maximum mesh of approximately .034 inch. This maximum size of the rubber dust particles permits sufficient compaction of the dust to adequately fill the interior of the tire without undue reduction of the resiliency of said tire.

Air or other dry gaseous fluid under pressure, such as 160 p.s.i., has been found to be most suitable for forcing rubber dust into the interior of a tire so as to completely fill the same; however, the annular contour of said tire interior necessitates injection of the dust by means of a pair of opposed openings as well as exhausting the air through one of the openings during dust injection through the other opening. In order to prevent bridging of the rubber dust, it is essential to jet the air in a plurality of streams having spaced points of origin between the rubber dust supply and the injection opening and to vary the operation of the streams.

In carrying out the method, the tube-type tire A is removed from the rim B to permit the forming of a pair of circular openings 2 in the inner peripheral portion of the tube C in opposed, preferably diametrically, relationship (FIG. 1). One of the openings 2 is provided by removing the valve stem (not shown) of the tube and enlarging the resulting orifice. Complementary openings 3 are formed in the rim in alinement with the tube openings and, when the tire is of tubeless type, it is unnecessary to remove said tire from said rim in order to form the openings in the latter. A flat, rectangular fastener or plate 4, of aluminum or other lightweight material, is inserted through each tube opening 2 for positioning against the internal surface of the tube in overlying relation to the opening. Each plate 4 has a screwthreaded opening 5 extending through its medial portion (FIGS. 6 and 7) for alinement with the tube and rim openings and, preferably, is of greater length than width to increase the area of its tube engaging surface. As shown by the numeral 6, the longitudinal margins of each plate may be bevelled or chamferred toward its tube engaging surface to permit said plate to be of maximum width for fitting between the marginal flanges of the rim B and the adjacent portions of the tube C. Although it is necessary to remove a tubeless tire from its rim in order to permit positioning of the plates 4 internally of the tire, it is readily apparent that said plates could be mounted externally of said tire by securement to the inner peripheral surface of the rim as shown at 4' in FIG. 10. When the plates are secured to the inner peripheral surface of the rim B externally of a tubeless tire, the rectangular shape of the plates is not required.

A filler nipple 7, having an externally screwthreaded tube or tubular shank 8 of reduced diameter at its inner end, is adapted to be removably mounted in each of the alined openings 2 and 3 with its shank extending therethrough for detachable connection with the overlying plate 4. As shown in FIGS. 1 and 2, the tubular shank 8 of each filler nipple 7 is of minimum length sufficient to permit screwthreaded engagement of said shank with the opening 5 of each plate. Manifestly, the shanks 8' of the nipples 7' may be of less length when the tire A is of the tubeless type and/or when the plates 4' are secured to the inner peripheral surface of the rim B externally of said tire (FIG. 10). Except for the shorter length of its shank 8', each nipple 7' is identical to the nipples 7 and the same primed numerals identify corresponding portions thereof. Minimum or short length of the relatively small bores 9 and 9' of the filler nipples is most desirable since such bores restrict the flow of the rubber dust and encourage the bridging tendency thereof.

As shown in FIGS. 4 and 5, each nipple 7 has an externally screw-threaded outer end portion or head 10 and an intermediate polygonal or wrench-face portion 11. The outer end surface 12 of the head 10 is concave or dished (FIGS. 1 and 2) for coacting with a complementary convex surface 13 of a T or a T-shaped fitting 14 of the apparatus 1 which is adapted to connect a source of rubber dust to the head of one of the nipples 7 at a time. Due to the relatively narrow width of the web portion of the rim B, minimum dimensions of the tube openings 2 and rim openings 3 are prerequisite in order to prevent undue weakening of the tube and rim as well as permit facile mounting of the filler nipple although said openings should be as large as feasible. As an example, the tube and rim openings may be approximately 7/16 of an inch in diameter. When these openings are of this size, the bores 9 of the nipples 7 may have a maximum diameter of approximately 5/16 of an inch.

The apparatus 1 includes a T-shaped body or T 15 having a cylindrical longitudinal bore or passage 16 extending therethrough and communicating with an upstanding, lateral branch or port 17 of substantially the same diameter (FIG. 2). An airtight rubber dust chamber or reservoir (not shown) has its hopper-like lower end 18 screwthreaded in the port 17 for supplying the dust to the passage 16 of the body 15, only the lower end portion of the chamber being shown since such chambers are well known. In order to facilitate the flow of the rubber dust from the chamber 18 through the lateral port of the body, an enlarged, screwthreaded portion 19 is provided at the upper end of said port for connection with the lower end 18 of said chamber so that said port and the interior of said chamber lower end are substantially flush. Annular end plates or caps 20 and 21 are screwthreaded in the ends of the longitudinal passage of the body 15 and have screwthreaded counterbores 22 and 23 at the outer portions of their relatively small bores for respective engagement by a lateral or transverse leg 24 of the T 14 and a tubular fitting or nipple 25.

The T 14 has a longitudinal bore 26 extending therethrough for alined communication with the bore 9 of the connected nipple 7 and a lateral or transverse communicating bore 27 which extends through the leg 24 of said T so as to communicate through the bore of the cap 20 with the passage 16. Preferably and most desirably, the cap bore and the transverse bore 27 of the T are of substantially the same diameter and may be of greater diameter than the longitudinal bore 26 of said T. Due to its desired aligned communication with the nipple bore, the longitudinal bore of the T is of restricted diameter but large enough to permit the flow of rubber dust from the transverse bore. As shown by the numeral 28, the outer or head portion of the nipple bore 9 may be tapered or gradually reduced toward its inner or shank portion to minimize interference with flow of the rubber dust to the interior of the tire A. In effect, the bores 26 and 27 of the T 14 form a continuation or part of the passage 16 of the body 15 even though said bores are of less diameter than said passage. An internally flanged, internally screwthreaded collar or coupling 29 is rotatably confined upon the T for detachable connection with the head 10 of one of the nipples whereby the convex surface 13 of said head may be drawn into snug engagement with the concave end surface 12 of said nipple head.

Opposite its communication with the bore of the connected nipple 7, the end portion of the longitudinal bore of the T 14 is screwthreaded for receiving a bushing or nipple 30 upon the outer end of which an internally flanged collar or gland 31 is screwthreaded. Suitable packing 32 may be confined in the gland 31 between its internal flange and the outer end of the bushing 30 for sealing off therebetween as well as around one end portion of a telescoping pipe or tube 33 which projects axially through said collar and bushing into the bore 26 of the T 14 in concentric relationship and which is connected by a supply line 34, in the form of a hose or flexible tubing, to a source (not shown) of air or other dry gaseous fluid under pressure. As best shown in FIG. 2, the tube 33 is of much less diameter than the bore 26 so as to provide an annular flow space therearound and is readily rotatable and movable axially of said bore into close proximity to the reduced bore portion 28 of the filler nipple. Preferably, the tube is angular to facilitate manipulation thereof when the T 14 is connected to one of the nipples 7 and has its inner end 35 cut at a 45° angle to facilitate unclogging of the nipple bore 9 when the rubber dust bridges thereacross. As shown in FIG. 9, a manual, open and shut valve 36 may be mounted in the hose 34 for controlling the flow of pressure fluid therethrough.

A cylindrical, complementary mounting member 37 is rotatably and slidably mounted in the bore of the nipple 25, which has one of its ends screwthreaded in the counterbore 23 of the end cap 21, so as to project axially into the passage 16 of the body 15 as well as outwardly of said nipple. If desired, the cap bore may be of only slightly greater diameter than the nipple bore and mounting member. An internally flanged collar or gland 38, having packing 39 confined therein, is screwthreaded on the outer end of the nipple for sealing off around the mounting member 37 as well as securing said member in adjusted positions. A pair of pipes or tubes 40 and 41 extends longitudinally through the mounting member so as to project into the passage and outwardly of said member, the tube 40 being of greater length than the tube 41. As shown in FIG. 2, the member 37 is adjusted so that the outlet end of the longer tube 40 is within the outer end of the lateral bore 27 of the T 14 with the shorter tube 41 being above said tube 40 and having its outlet end slightly past or downstream of the center of the lateral port 17 of the body. Supply lines 42 and 43, similar to the supply line 34, connect the latter tubes to the source of pressure fluid and may have control valves, similar to the valve 36 but not shown, mounted therein. It is noted that the construction of the valves is subject to variation and that a single valve may be provided for controlling flow through all three of the hoses. It has been found that valves of the full open and shut type are most satisfactory. Due to the contiguous relationship of the tubes 40 and 41, one of said tubes is angular to permit connection of the lines 42 and 43 without interference.

For coacting with the apparatus 1, a cylindrical filter element or screen 44 (FIG. 3) is provided for engagement within the bore 9 of one of the nipples 7 (FIG. 1) when said apparatus is connected by the T 14 to the other filler nipple. The screen 44 is of substantially the same diameter as the nipple bores 9 so as to have a snug fit therein and is constructed of woven wire having a fine mesh or of other suitable foraminous material. Although subject to variation, it is preferable to form the screen by rolling or coiling a sheet of the foraminous material in tight convolutions whereby said screen is substantially solid and has minute interslices to permit the passage of air therethrough while obstructing the rubber dust. A screwthreaded plug 45 (FIG. 8) is provided for engagement with the opening 5 of each plate 4 after filling of the tire after removal of the filler nipples so as to close the rim openings 3 and prevent escape of the rubber dust.

OPERATION

In practicing the method of this invention, the T 14 of the apparatus 1 is connected by its collar 29 to the head 10 of one of the nipples 7 and the filter screen 44 is inserted in the bore 9 of the other filler nipple. The valve 36 of the supply line 34 is opened to jet a stream of air through the longitudinal bore 26 of the T to clear the bore of the connected nipple as well as feed rubber dust to the interior of the tire, and the tube 33 of said line may be reciprocated and rotated to mechanically as well as pneumatically unclog said nipple bore at the initiation as well as during any portion of the filling procedure. Since only a relatively small quantity of rubber dust is picked up by this first air stream, the valve of the supply line 42 is opened to jet a second stream of air into the T 14 for drawing dust from the passage 16 of the body 15 through the transverse bore 27 of said T to its longitudinal bore wherein the flow of said dust is accelerated by said first stream. Due to the location of the outlet ends of the tubes 33 and 40, the feeding of the rubber dust to the tire interior is relatively slow. Accordingly, the filling time may be shortened by opening the valve of the supply line 43 to jet a third stream through the passage even though this additional flow of the dust increases its tendency to bridge across and clog the nipple bore 9. As should be apparent, the filter screen permits exhaust of the air and prevents escape of the rubber dust from the interior of the tire during the injection of said dust.

Usually, the valves of the supply lines are opened and closed in sequence from the first to the third valve during the first stage of filling and are closed and opened sequentially from the third to the second and/or first valves intermittently during the remainder of the operation, with said first valve being closed upon opening of said third valve and the latter being closed upon opening of the former. It is noted, however, that the first valve 36 may be opened and the tube 33 moved toward the nipple at any time the rubber dust commences to bridge. Since the latter tube is rotatable and its outlet end 35 is bevelled, said tube may be used mechanically to assist the first air stream in unclogging the bore of the nipple 7. The second air stream is adapted to coact with both the first and third air streams. In addition to preventing bridging of the rubber dust, the location of the tube 33 adjacent the nipple is advantageous in completing the filling through each nipple and compacting said dust to the desired density, such as an effective pressure of 45 p.s.i. Manifestly, the injection of the dust becomes more difficult as the filling progresses and is most difficult during the terminal portion of filling.

Upon completion of filling approximately one-half of the tire through one of the filler nipples 7, the T 14 is disconnected and the filter screen 44 withdrawn to permit reversal of the positions thereof. The second step of filling is identical to the first and is necessary due to the characteristics of rubber dust as well as the annular contour of the tire interior and its relatively small transverse area. When the tire is filled to the desired density, both filler nipples are removed and the plugs 45 are screwthreaded into the openings 5 of the plates 4 to close the openings 3 of the rim B and the openings 2 of the tube C if the tire A is of the tube type. When the plates are disposed within the interior of the tire or its tube, the packed rubber dust prevents displacement of the plates and permits the connection of the plugs thereto.

It is pointed out that the maximum pressure of the air or other pressure fluid is limited by the capacities of the supply sources available at the relatively remote locales of insertion of the rubber dust, said capacities varying due to the mechanical conditions and frequency of use of said supply sources, as well as the capacities of the tires and safety precautions. Therefore, it is readily apparent that the provision of means for jetting a plurality of air streams at spaced points has the additional advantage of making it possible as well as practicable to utilize a relatively low pressure, such as 160 p.s.i., without unduly prolonging the filling operation. When the web portions of the rims of the vehicle wheels are of greater width, such as motorcycle, golf cart, tractor and wheel barrow wheels, the openings 3 of said rims for receiving the shanks 8 of the filler nipples 7 may be of larger diameter and said shanks may be screwthreaded into said rim openings if said rims are of sufficient thickness whereby the use of the plates 4 is not essential. As an example, the rim openings may be of a size large enough to accommodate filler nipples having minimum bore diameters of ½ an inch so as to permit a greater volume of rubber dust flow and more rapid filling of the tire. Also, the larger orifice areas of the nipples permit denser final compaction of the rubber dust without the necessity of employing higher air pressure, it being noted that certain tractor and other tires require relatively high density or firmness.

The foregoing description of the invention is explanatory thereof and various changes in the size, shape and materials, as well as in the details of the illustrated construction may be made, within the scope of the appended claims, without departing from the spirit of the invention.

I claim:
1. The method of filling with comminuted elastic material a pneumatic tire mounted on a rim and having an inner tube or being tubeless which includes
providing a pair of openings in the tire rim in generally opposed relationship and in communication with the interior of the tire,
forcing comminuted elastic material under gaseous fluid pressure into the tire interior through the first of the openings,
simultaneously exhausting the gaseous pressure fluid from said tire interior through the second of said openings while obstructing the latter opening sufficiently to prevent the passage of the comminuted elastic material therethrough,
then injecting the pressurized material through said second opening while simultaneously exhausting said pressure fluid and preventing the escape of said material through said first opening to complete the filling of said tire interior,
and finally closing said openings to maintain said material within said tire interior.

2. The method set forth in claim 1 which, when the tire has an inner tube, includes the step of
extending the pair of generally opposed openings of the rim through the inner peripheral portion of the inner tube to permit the introduction of the comminuted elastic material into said tube.

3. The method set forth in claim 1 which includes the steps of
supplying comminuted elastic material to a passage communicating with the rim opening through which said material is injected into the interior of the tire,
and jetting gaseous fluid under pressure through the passage toward said opening to conduct said material to said tire interior.

4. The method set forth in claim 3 wherein
the step of jetting gaseous fluid under pressure through the passage adjacent the rim opening communicating therewith to flush said opening and prevent bridging of said material therein,
and emitting at least a second stream of said pressure fluid into said passage upstream of the emission point of the first pressure fluid stream to force said material through said passage and into said tire interior,
the streams of pressure fluid being capable of intermittent flow independently of each other and coacting to conduct said material to said tire interior as well as prevent clogging of said opening.

5. The method set forth in claim 4 wherein
the emission point of the first stream of gaseous pressure fluid into the passage is substantially in alinement with the opening of the rim communicating with said passage and is movable axially of said rim opening to assist the second stream of pressure fluid in the conduction of the comminuted elastic material to the interior of the tire and prevent the bridging of said material in said rim opening.

6. The method set forth in claim 4 wherein
the step of jetting gaseous fluid under pressure through the passage for conducting comminuted elastic material to the interior of the tire includes
emitting a third stream of said pressure fluid into said passage upstream of the emission point of the second stream of pressure fluid and adjacent the supply point of said material thereto for feeding said material toward the opening of the rim communicating with said passage,
the third stream of pressure fluid being capable of intermittent flow independently of the first and second streams of pressure fluid.

7. The method set forth in claim 3 wherein
the step of jetting gaseous fluid under pressure through the passage for conducting comminuted elastic material to the interior of the tire includes
emitting a plurality of streams of said pressure fluid into said passage at intervals spaced longitudinally thereof,
the pressure fluid streams being capable of independent and simultaneous flow to force said material through said passage and prevent bridging thereof.

8. An apparatus for filling with comminuted elastic material a pneumatic tire mounted on a rim and having an inner tube or being tubeless, the rim being provided with a pair of openings in generally opposed relationship communicating with the interior of the tire, including
reservoir means for comminuted elastic material means forming a passage in communication with the reservoir means, means for detachably connecting the passage forming means to one of the openings of said rim at a time to conduct the comminuted elastic material from said reservoir means to said tire interior, means for jetting gaseous fluid under pressure through said passage forming means toward the connecting means for injecting said material into said tire interior, and filter means for obstructing one of said rim openings at a time sufficiently to prevent the escape of said material and permit the exhaust of the gaseous pressure fluid therethrough during injection of said material through the other of said rim openings into said tire interior.

9. An apparatus as set forth in claim 8 wherein
the means for jetting gaseous fluid under pressure through the passage forming means toward the connecting means includes means for emitting streams of gaseous pressure fluid at spaced intervals between the reservoir and connecting means to inject the comminuted elastic material into the interior of the tire and prevent bridging of said material, the pressure fluid emitting means being operable independently of and simultaneously with one another.

10. An apparatus as set forth in claim 9 wherein
the means for emitting streams of gaseous pressure fluid at spaced intervals of the passage forming means includes first pressure fluid egress means in said passage forming means adjacent its communication with the connecting means to prevent bridging of the comminuted elastic material, and at least second pressure fluid egress means in said passage forming means upstream of the first egress means for forcing said material through said passage forming means into the interior of the tire.

11. An apparatus as set forth in claim 10 wherein
the means for emitting streams of gaseous pressure fluid at spaced intervals of the passage forming means includes third pressure fluid egress means in the passage forming means upstream of the second egress means and adjacent the reservoir means for feeding comminuted elastic material toward the connecting means.

12. An apparatus as set forth in claim 9 wherein
one of the egress means for the gaseous pressure fluid is substantially in axial alinement with the opening of the rim to which the connecting means it attached.

13. An apparatus as set forth in claim 10 wherein
the first egress means for the gaseous pressure fluid is movable toward and away from the opening of the rim to which the connecting means is attached.

References Cited

UNITED STATES PATENTS 3,295,565   1/1967   Grandy _____ 141—77 X

HOUSTON S. BELL, Jr., *Primary Examiner.*

U.S. Cl. X.R.

141—38, 59, 67, 286